United States Patent
Hayashi et al.

(10) Patent No.: US 8,737,224 B2
(45) Date of Patent: May 27, 2014

(54) COMMUNICATION METHOD, COMMUNICATION SYSTEM, AND CONTROL APPARATUS

(75) Inventors: Takahiro Hayashi, Yokosuka (JP); Masafumi Masuda, Yokosuka (JP); Hidehiro Ando, Yokohama (JP); Takaaki Sato, Kawasaki (JP); Yoshiyuki Yasuda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 167 days.

(21) Appl. No.: 13/382,073

(22) PCT Filed: Jul. 2, 2010

(86) PCT No.: PCT/JP2010/061342
§ 371 (c)(1),
(2), (4) Date: Mar. 9, 2012

(87) PCT Pub. No.: WO2011/002085
PCT Pub. Date: Jan. 6, 2011

(65) Prior Publication Data
US 2012/0155392 A1    Jun. 21, 2012

(30) Foreign Application Priority Data
Jul. 2, 2009 (JP) ................................. 2009-157886

(51) Int. Cl.
*H04J 1/16* (2006.01)
(52) U.S. Cl.
USPC ......................................... 370/235; 370/360
(58) Field of Classification Search
USPC .......................... 370/229, 231, 235, 349, 252
See application file for complete search history.

(56) References Cited

U.S. PATENT DOCUMENTS

| | | | |
|---|---|---|---|
| 6,219,713 B1 * | 4/2001 | Ruutu et al. | 709/235 |
| 2004/0228285 A1 | 11/2004 | Moon et al. | |
| 2008/0188224 A1 | 8/2008 | Pani et al. | |
| 2008/0225893 A1 | 9/2008 | Cave et al. | |
| 2008/0239948 A1 * | 10/2008 | Bai et al. | 370/230 |
| 2009/0044067 A1 | 2/2009 | Obuchi et al. | |

FOREIGN PATENT DOCUMENTS

| | | |
|---|---|---|
| JP | 2004 364277 | 12/2004 |
| JP | 2009 44370 | 2/2009 |
| JP | 2010-518695 A | 5/2010 |
| WO | 2008 097486 | 8/2008 |
| WO | 2008 115488 | 9/2008 |

OTHER PUBLICATIONS

Japanese Office Action issued Nov. 27, 2012 in Patent Application No. 2009-157886 with English Translation.
Office Action issued Aug. 21, 2012, in Japanese Patent Application No. 2009-157886 with English translation.
3GPP TS 25.331 V5.19.0, pp. 1-1045, (Dec. 2006).
International Search Report Issued Jul. 27, 2010 in PCT/JP10/61342 Filed Jul. 2, 2010.

* cited by examiner

*Primary Examiner* — Brenda H Pham
(74) *Attorney, Agent, or Firm* — Oblon, Spivak, McClelland, Maier & Neustadt, L.L.P.

(57) ABSTRACT

Disclosed is a communication method for switching between a first connection state, in which a data unit is transmitted in a first size, and a second connection state, in which a data unit is transmitted in a second size which is larger than the first size. The communication method comprises a step of maintaining the size of a data unit at the first size in a case where there is a transition from the first connection state to the second connection state after there had been a transition from the second connection state to the first connection state.

8 Claims, 4 Drawing Sheets

COMMUNICATION METHOD, COMMUNICATION SYSTEM, AND CONTROL APPARATUS

TECHNICAL FIELD

The present invention relates to a communication method of switching a first connection state that transmits a data unit in a first size and a second connection state that transmits a data unit in a second size, which is larger than the first size, a communication system therefor, and a control apparatus therefor.

BACKGROUND ART

In recent years, technologies such as HSDPA (High Speed Downlink Packet Access) and HSUPA (High Speed Uplink Packet Access) that improve the transmission rate of data have been proposed.

Here, according to R99 (Release 99) standard, data is transmitted by using DCH (Dedicated Channel). For example, in the DCH, the size of PDU: Protocol Data Unit (for example, RLC PDU) is the first size (for example, 42 octets).

On the other hand, in HSDPA, data is transmitted by using HS-DSCH (High Speed Downlink Shared Channel). For example, in HS-DSCH, the size of PDU (for example, RLC PDU) is the second size (82 octets). Note that the second size is larger than the first size.

Thus, by using the PDU of the second size, which is larger than the first size, the data transmission rate can be improved without extending the possible range of the sequence numbers allocated to the PDU (for example, Patent Document 1).

A receiver is configured to accumulate PDUs in a buffer, and to transmit acknowledge information (ACK/NACK) to a transmitter indicating whether or not the receiver receives the PDU successfully. By using the PDU that are retransmitted from the transmitter, the receiver recovers an error of the PDU that could not be received by the receiver.

As described above, if the size of the PDU changes, the size of the PDUs accumulated in the buffer becomes different from the size of the PDU retransmitted from the transmitter. As a result, because the error occurring in a radio interval cannot be recovered, the PDUs accumulated in the buffer are discarded. Thus, due to a change in the size of the PDU, the already transmitted PDU becomes useless, which results in a loss of data.

Similarly, when the size of the PDU is changed, transmitter needs to discard the PDU that has not acquired the acknowledge information indicating that the receiver has been successful in receiving the PDU, which results in a loss of data.

PRIOR ART DOCUMENT

Patent Document

Patent Document 1: Japanese Unexamined Patent Application Publication No. 2004-364277

SUMMARY OF THE INVENTION

A communication method according to a first feature is a method of switching between a first connection state that transmits a data unit in a first size and a second connection state that transmits the data unit in a second size that is larger than the first size. The communication method includes: step of maintaining the size of the data unit in the first size, when transition is performed from the first connection state to the second connection state after transition is performed from the second connection state to the first connection state.

In the first feature, the communication method includes: step transmitting, from a receiver configured to receive the data unit to a transmitter configured to transmit the data unit, acknowledge information indicating whether or not the data unit is received successfully; and step of retransmitting, from the transmitter to the receiver, the data unit for which the receiver fails to receive.

In the first feature, the first size and the second size are of a fixed length. The data unit is a protocol data unit of the RLC layer.

In the first feature, the first size is 42 octets. The second size is 82 octets.

In the first feature, the first connection state is a common channel connection state. The second connection state is an HSDPA connection state.

In the first feature, the first connection state is a dedicated channel connection state. The second connection state is an HSDPA connection state.

A communication system according to a second feature switches between a first connection state that transmits the data unit in a first size and a second connection state that transmits the data unit in a second size that is larger than the first size. The communication system includes: a control unit configured to maintain the size of the data unit in the first size, when transition is performed from the first connection state to the second connection state after transition is performed from the second connection state to the first connection state.

A control apparatus according to a third feature switches between a first connection state that transmits the data unit in a first size and a second connection state that transmits the data unit in a second size that is larger than the first size. The control apparatus includes: a control unit configured to maintain the size of the data unit in the first size, when transition is performed from the first connection state to the second connection state after transition is performed from the second connection state to the first connection state.

BEST MODES FOR CARRYING OUT THE INVENTION

Figure 1:
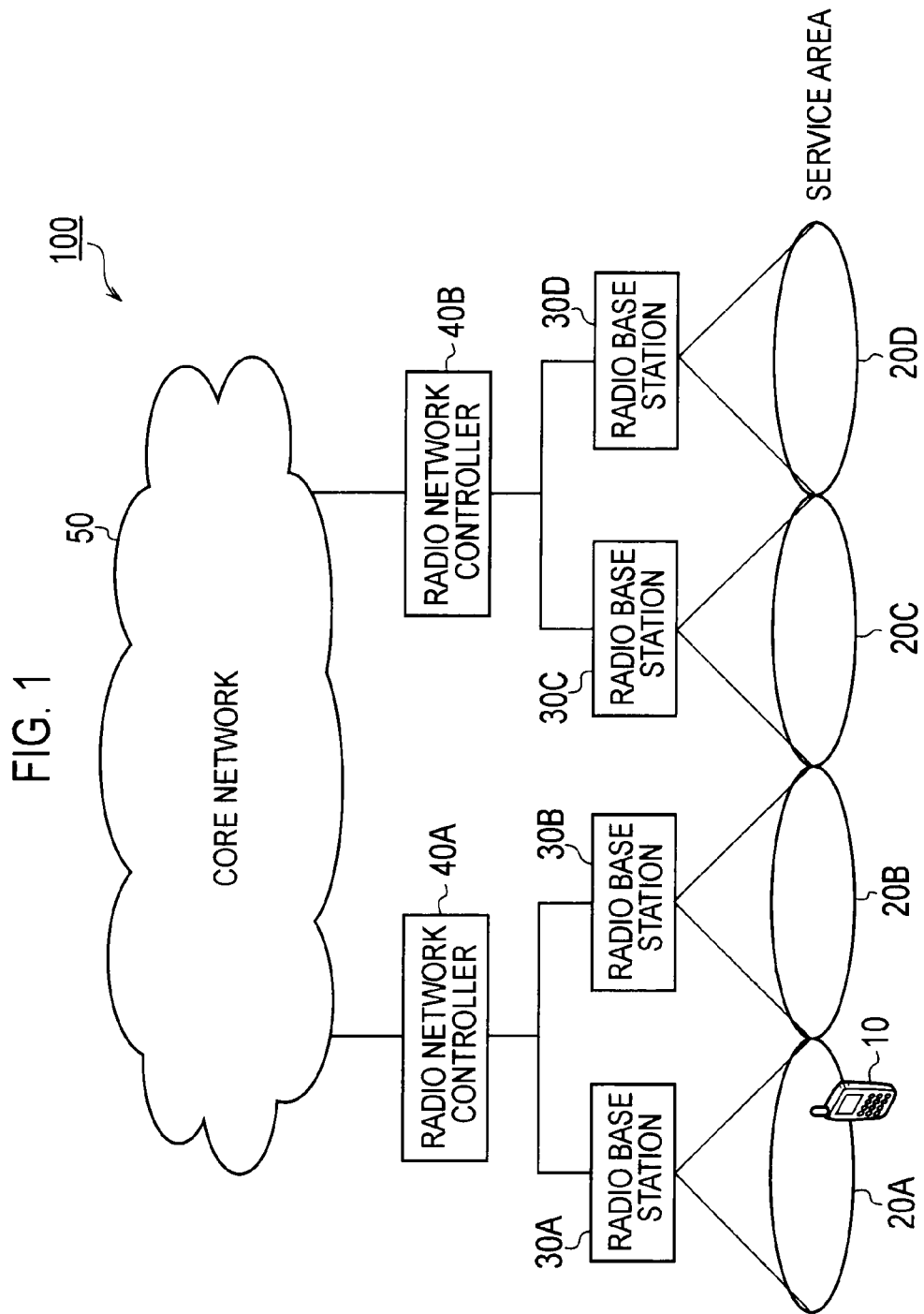
FIG. 1 is a diagram showing the configuration of a communication system 100 according to a first embodiment.

Hereinafter, a communication method, a communication system, and a control apparatus according to an embodiment of the present invention are described with reference to the drawings. Note that in the descriptions of the drawing, identical or similar symbols are assigned to identical or similar portions.

It will be appreciated that the drawings are schematically shown and the ratio and the like of each dimension are different from the real ones. Therefore, the specific dimensions, etc., should be determined in consideration of the following explanations. Of course, among the drawings, the dimensional relationship and the ratio are different.

Overview of the Embodiment

A communication method according to an embodiment is a method of switching between a first connection state that transmits a data unit in a first size and a second connection state that transmits a data unit in a second size that is larger than the first size. The communication method includes a step of maintaining the size of the data unit in the first size, when transition is performed from the first connection state to the second connection state after transition is performed from the second connection state to the first connection state.

A communication system and a control apparatus according to an embodiment switch between a first connection state that transmits a data unit in a first size, and a second connection state that transmits a data unit in a second size that is larger than the first size. The communication system includes a control unit configured to maintain the size of the data unit in the first size, when transition is performed from the first connection state to the second connection state after transition is performed from the second connection state to the first connection state.

In the embodiment, when transition is performed from the first connection state to the second connection state after transition from the second connection state to the first connection state, the size of the data unit is maintained in the first size without changing to the second size. Thus, the rise in the transmission rate is compromised, but the discard of the data unit due to a change in the size of the data unit is prevented. That is, the loss of data is reduced.

First Embodiment (Configuration of the Communication System)

A configuration of the communication system according to a first embodiment is explained below with reference to drawings. FIG. 1 is a diagram showing a configuration of a communication system 100 according to the first embodiment.

As shown in FIG. 1, the communication system 100 includes a mobile station 10, a radio base station 30, a radio network controller 40, and a core network 50.

The mobile station 10 communicates with the radio network controller 40 via the radio base station 30 that manages a service area 20 in which the mobile station exists. The mobile station 10 functions as a receiver configured to receive downlink data, and also functions as a transmitter configured to transmit uplink data.

The radio base station 30 manages the service area 20 and communicates with the mobile station 10 that exists in the service area 20.

The service area 20 may be configured by a single cell or by a plurality of cells. Note that a cell is identified by the frequency, the time slot, or the diffusion code. Furthermore, a cell may also be thought of as a function provided in the radio base station 30 rather than just a spatial area.

For example, in the first embodiment, a radio base station 30A to a radio base station 30D are provided as the radio base station 30. The radio base station 30A to the radio base station 30D manage a service area 20A to a service area 20D, respectively.

The radio network controller 40 manages the radio base station 30 and communicates with the mobile station 10 via the radio base station 30. The radio network controller 40 functions as a transmitter configured to transmit downlink data, and also functions as a receiver configured to receive uplink data.

For example, in the first embodiment, a radio network controller 40A to a radio network controller 40B are provided as the radio network controller 40. The radio network controller 40A manages the radio base station 30A and the radio base station 30B, while the radio network controller 40B manages the radio base station 30C and the radio base station 30D.

The core network 50 is connected to a radio access network configured by the radio base station 30 and the radio network controller 40. The core network 50 has a line switching center, a packet switching center, etc.

Note that in the first embodiment, HSDPA (High Speed Downlink Packet Access) is used as an example to explain the state transition of the mobile station 10. Furthermore, a downlink communication is used as an example in the explanation. That is, the mobile station 10 functions as a receiver, and the radio network controller 40 serves a function as a transmitter. Finally, the radio network controller 40 functions as a control apparatus.

(State Transition)

Figure 2:
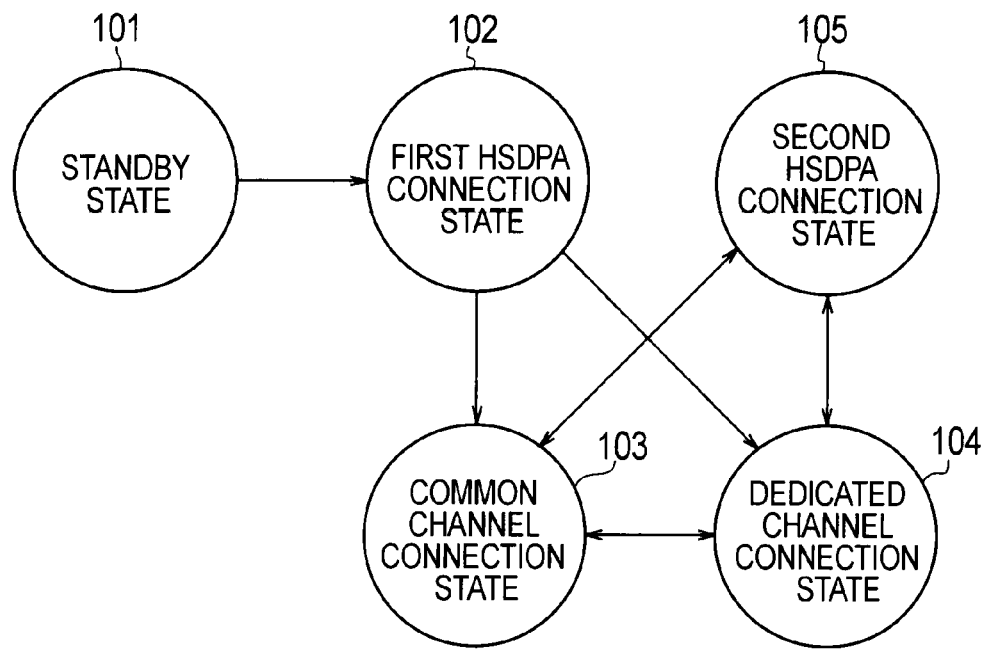
FIG. 2 is a diagram showing a state transition according to the first embodiment.

The state transition according to the first embodiment is explained below with reference to drawings. FIG. 2 is a diagram showing the state transition according to the first embodiment.

As shown in FIG. 2, the states of the mobile station 10 include a standby state 101, a first HSPDA connection state 102, a common channel connection state 103, a dedicated channel connection state 104, and a second HSDPA connection state 105.

The standby state 101 is a state in which a radio link has not been set. Note that in the standby state 101, the mobile station 10 executes a location registration process, a cell selection process, etc.

The first HSDPA connection state 102 is a state in which a channel (radio link) compatible with HSDPA has been set. The channel compatible with HSDPA is HS-DSCH (High Speed Downlink Shared Channel), for example. HS-DSCH is a channel that is shared by a plurality of mobile stations 10.

The common channel connection state 103 is the state in which a common channel (radio link) is set to the mobile stations 10 that exist in a cell. The channel common to the mobile stations 10 that exist in a cell is FACH (Forward Access Channel), for example.

When the flow rate of the downlink data falls below the predetermined threshold value, the mobile station 10 makes transition to the common channel connection state 103. For example, the mobile station 10 makes transition from the first HSDPA connection state 102 to the common channel connection state 103. Note that the mobile station 10 may also make transition from the dedicated channel connection state 104 and the second HSDPA connection state 105 to the common channel connection state 103.

The dedicated channel connection state 104 is the state in which a dedicated channel (radio link) has been set to a mobile station 10. The channel individual to the mobile station 10 is DCH (Dedicated Channel), for example.

When the mobile station 10 moves to an existing cell that does not support HSDPA, the mobile station 10 makes transition from the first HSDPA connection state 102 to the dedicated channel connection state 104. Note that the mobile station 10 may also make transition from the common channel connection state 103 and the second HSDPA connection state 105 to the dedicated channel connection state 104.

Note that although not shown in the figure, when the mobile station 10 starts communicating in an existing cell that does not support HSDPA, it is but obvious that the mobile station 10 may also make transition from the standby state 101 to the dedicated channel connection state 104.

Same as the first HSDPA connection state 102, the second HSDPA connection state 105 is a state in which a channel (radio link) compatible with HSDPA has been set. Note that the second HSDPA connection state 105 is the state in which after making transition from the first HSDPA connection state 102 to the common channel connection state 103, transition to the HSDPA connection state is performed again. Similarly, the second HSDPA connection state 105 is the state in which after making transition from the first HSDPA connection state 102 to the dedicated channel connection state 104, transition to the HSDPA connection state is performed again.

Note that the first HSDPA connection state 102 and the second HSDPA connection state 105 have been explained as separate states only for the sake of easy explanation. The first HSDPA connection state 102 and the second HSDPA connection state 105 are the states in which a channel (radio link) compatible with HSDPA has been set, and in these states, only the size of the data unit is different.

(Size of Data Unit)

The size of a data unit according to the first embodiment is described below. In the first embodiment, a case of using two sizes (a first size and a second size) as the size of a data unit is explained.

The first size is the size of a data unit used in the common channel connection state 103, the dedicated channel connection state 104, and the second HSDPA connection state 105. Note that the first size is 42 octets, for example (see 3GPP TS34.108).

The second size is the size of a data unit used in the first HSDPA connection state 102. Note that the second size is larger than the first size. The second size is 82 octets, for example (see 3GPP TS34.108).

Here, the second HSDPA connection state 105 is the HSDPA connection state, and it should be noted that in the second HSDPA connection state 105, the same size (first size) of the data unit as that in a state prior to transition (common channel connection state 103 or dedicated channel connection state 104) is used. That is, in the second HSDPA connection state 105, the size (first size) of the data unit in the state prior to transition (common channel connection state 103 or dedicated channel connection state 104) is maintained.

In the first embodiment, RLC PDU (Protocol Data Unit) processed in an RLC (Radio Link Control) layer is illustrated as a data unit. Furthermore, the first size and the second size are of a fixed length.

(Configuration of Mobile Station)

Figure 3:
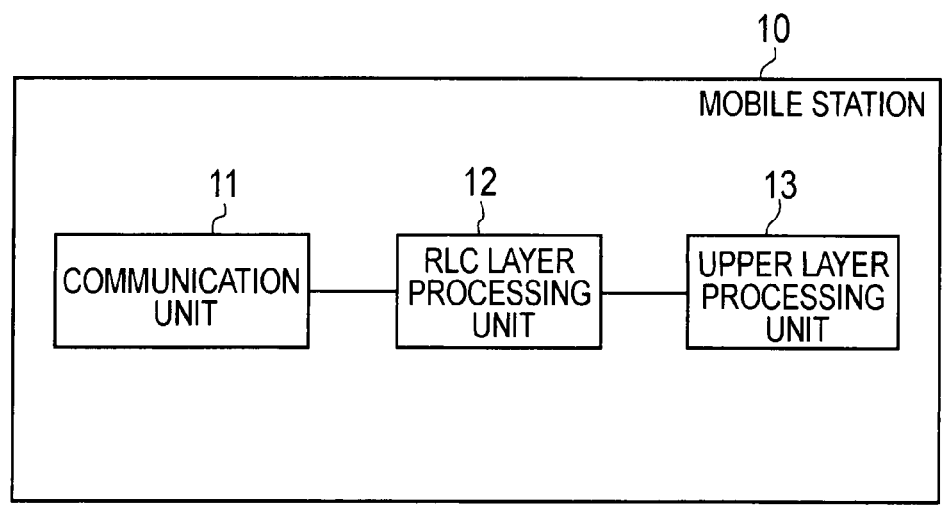
FIG. 3 is a diagram showing the configuration of a mobile station 10 according to the first embodiment.

A configuration of the mobile station according to the first embodiment is explained below with reference to drawings. FIG. 3 is a diagram showing a configuration of the mobile station 10 according to the first embodiment.

As shown in FIG. 3, the mobile station 10 has a communication unit 11, an RLC layer processing unit 12, and an upper layer processing unit 13.

The communication unit 11 is configured to communicate with the radio network controller 40 via the radio base station 30. For example, the communication unit 11 communicates the user data and control data.

The control data includes a connection request (such as an RRC Connection Request), an RAB connection setup (Radio Bearer Setup), and an RAB switching setup (Radio Bearer Reconfiguration).

The connection request (such as an RRC Connection Request) is a message (RRC (Radio Resource Control) message) transmitted from the mobile station 10 to the radio network controller 40. The connection request (such as an RRC Connection Request) is a message requesting the setup of a radio link.

The RAB connection setup (Radio Bearer Setup) is a message (RRC message) transmitted from the radio network controller 40 to the mobile station 10. The RAB connection setup (Radio Bearer Setup) is a message indicating the connection setup of a radio link, and includes information specifying the size of RLC PDU.

The RAB switching setup (Radio Bearer Reconfiguration) is a message (RRC message) transmitted from the radio network controller 40 to the mobile station 10. The RAB switching setup (Radio Bearer Reconfiguration) is a message indicating the switching setup of a radio link, and includes information specifying the size of RLC PDU.

The RLC layer processing unit 12 is configured to execute the processing in the RLC layer. More specifically, the RLC layer processing unit 12 includes a buffer, and stores the RLC PDU received from the radio network controller 40 in the buffer. Note that the RLC layer processing unit 12 is configured to process the RLC PDU in the size specified by the RAB connection setup (Radio Bearer Setup) or RAB switching setup (Radio Bearer Reconfiguration). Furthermore, the RLC layer processing unit 12 is configured to discard the RLC PDU stored in the buffer when the size of the RLC PDU changes.

Here, it must be noted that the RLC layer processing unit 12 may also execute the following processing, for example.

(1) The RLC layer processing unit 12 is configured to re-arrange the RLC PDUs stored in the buffer based on the sequence number set for the RLC PDU.

(2) The RLC layer processing unit 12 is configured to transmit the acknowledge information indicating whether or not the RLC PDU has been received successfully, to the radio base station 30. The acknowledge information is either "ACK" indicating that the reception of the RLC PDU has been successful or "NACK" indicating that the reception of the RLC PDU has been failed.

It should be noted that the RLC layer processing unit is provided in the radio network controller 40, and that the radio network controller 40 retransmits the RLC PDUs that has not been received by the mobile station 10. As a result, the RLC layer processing unit 12 recovers the error in the radio interval based on the RLC PDU retransmitted from the radio network controller 40.

The upper layer processing unit 13 is configured to execute the processing according to the RRC message received from the radio network controller 40. For example, the upper layer processing unit 13 notifies the RLC layer processing unit 12 of the size of the RLC PDU depending on the RAB connection setup (Radio Bearer Setup) or the RAB switching setup (Radio Bearer Reconfiguration).

(Configuration of Radio Network Controller)

Figure 4:
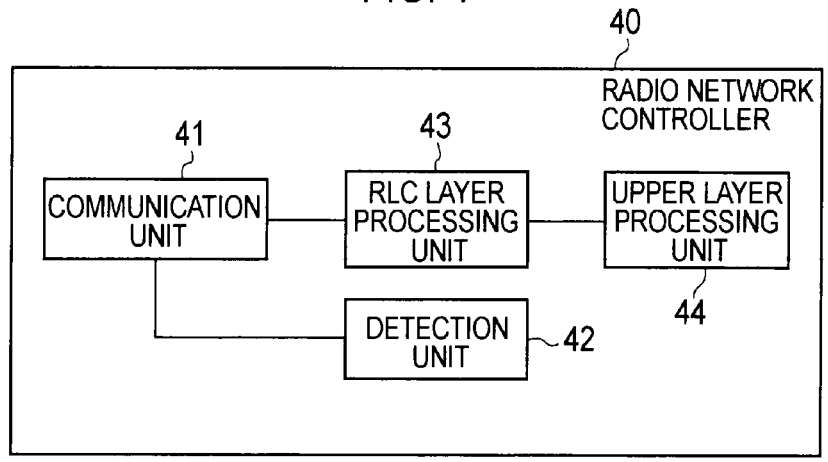
FIG. 4 is a diagram showing the configuration of a radio network controller 40 according to the first embodiment.

A configuration of the radio network controller according to the first embodiment is explained below with reference to drawings. FIG. 4 is a diagram showing a configuration of the radio network controller 40 according to the first embodiment.

As shown in FIG. 4, the radio network controller 40 has a communication unit 41, a detection unit 42, an RLC layer processing unit 43, and an upper layer processing unit 44.

The communication unit 41 is configured to communicate with the mobile station 10 via the radio base station 30. For example, the communication unit 41 communicates the user data and control data.

The detection unit 42 is configured to detect a trigger for making transition of a state of the mobile station 10. For example, the detection unit 42 detects a change in the flow rate of the downlink data or a change in the position of the mobile station 10.

Firstly, in the first HSDPA connection state 102, the detection unit 42 detects that the flow rate of the downlink data has fallen below the predetermined threshold value. The fall of the flow rate of the downlink data below the predetermined threshold value is a trigger for transition of the state of the mobile station 10 from the first HSDPA connection state 102 to the common channel connection state 103. Furthermore, the detection unit 42 detects that the flow rate of the downlink data has exceeded the predetermined threshold value in the common channel connection state 103. The rise of the flow rate of the downlink data above the predetermined threshold value is a trigger for transition of the state of the mobile station 10 from the common channel connection state 103 to the second HSDPA connection state 105.

Secondly, the detection unit 42 detects that the mobile station 10 has moved from within a cell compatible with HSDPA to outside a cell compatible with HSDPA in the first HSDPA connection state 102. The movement from within a cell compatible with HSDPA to outside a cell compatible with HSDPA is a trigger for transition of the state of the mobile station 10 from the first HSDPA connection state 102 to the dedicated channel connection state 104. Furthermore, the detection unit 42 detects that the mobile station 10 has moved from outside a cell compatible with HSDPA to within a cell compatible with HSDPA in the dedicated channel connection state 104. The movement from outside a cell compatible with HSDPA to within a cell compatible with HSDPA is a trigger for transition of the state of the mobile station 10 from the dedicated channel connection state 104 to the second HSDPA connection state 105.

The RLC layer processing unit 43 is configured to execute the processing in the RLC layer. More specifically, the RLC layer processing unit 43 instructs the communication unit 41 to transmit the RLC PDU for which a sequence number has been set to the mobile station 10 via the radio base station 30.

The upper layer processing unit 44 is configured to execute the processing in the RRC layer. More specifically, the upper layer processing unit 44 instructs the communication unit 41 to transmit the RAB connection setup (Radio Bearer Setup) or the RAB switching setup (Radio Bearer Reconfiguration) to the mobile station 10 via the radio base station 30.

Here, the upper layer processing unit 44 is configured to control the size of the RLC PDU according to the detection results of the detection unit 42.

Firstly, when it is detected that the flow rate of the downlink data has fallen below the predetermined threshold value in the first HSDPA connection state 102, the upper layer processing unit 44 instructs the communication unit 41 to transmit the RAB switching setup (Radio Bearer Reconfiguration) specifying the first size as the size of the RLC PDU. Furthermore, when it is detected that the flow rate of the downlink data has exceeded the predetermined threshold value in the common channel connection state 103, the upper layer processing unit 44 instructs the communication unit 41 to transmit the RAB switching setup (Radio Bearer Reconfiguration) specifying the first size as the size of the RLC PDU.

Thus, when transition is performed from the common channel connection state 103 to the second HSDPA connection state 105 after transition from the first HSDPA connection state 102 to the common channel connection state 103, the upper layer processing unit 44 maintains the size of the RLC PDU in the first size.

Secondly, when it is detected that the mobile station 10 has moved from within a cell compatible with HSDPA to outside a cell compatible with HSDPA in the first HSDPA connection state 102, the upper layer processing unit 44 instructs the communication unit 41 to transmit the RAB switching setup (Radio Bearer Reconfiguration) specifying the first size as the size of the RLC PDU. Furthermore, when it is detected that the mobile station 10 has moved from outside a cell compatible with HSDPA to within a cell compatible with HSDPA in the dedicated channel connection state 104, the upper layer processing unit 44 instructs the communication unit 41 to transmit the RAB switching setup (Radio Bearer Reconfiguration) specifying the first size as the size of the RLC PDU.

Thus, when transition is performed from the dedicated channel connection state 104 to the second HSDPA connection state 105 after transition from the first HSDPA connection state 102 to the dedicated channel connection state 104, the upper layer processing unit 44 maintains the size of the RLC PDU in the first size.

Note that when a connection request (such as an RRC Connection Request) requesting the setup of a channel (radio link) compatible with HSDPA is received in the standby state 101, the upper layer processing unit 44 instructs the communication unit 41 to transmit the RAB connection setup (Radio Bearer Setup) specifying the second size as the size of the RLC PDU.

(Operation of Communication System)

Figure 5:
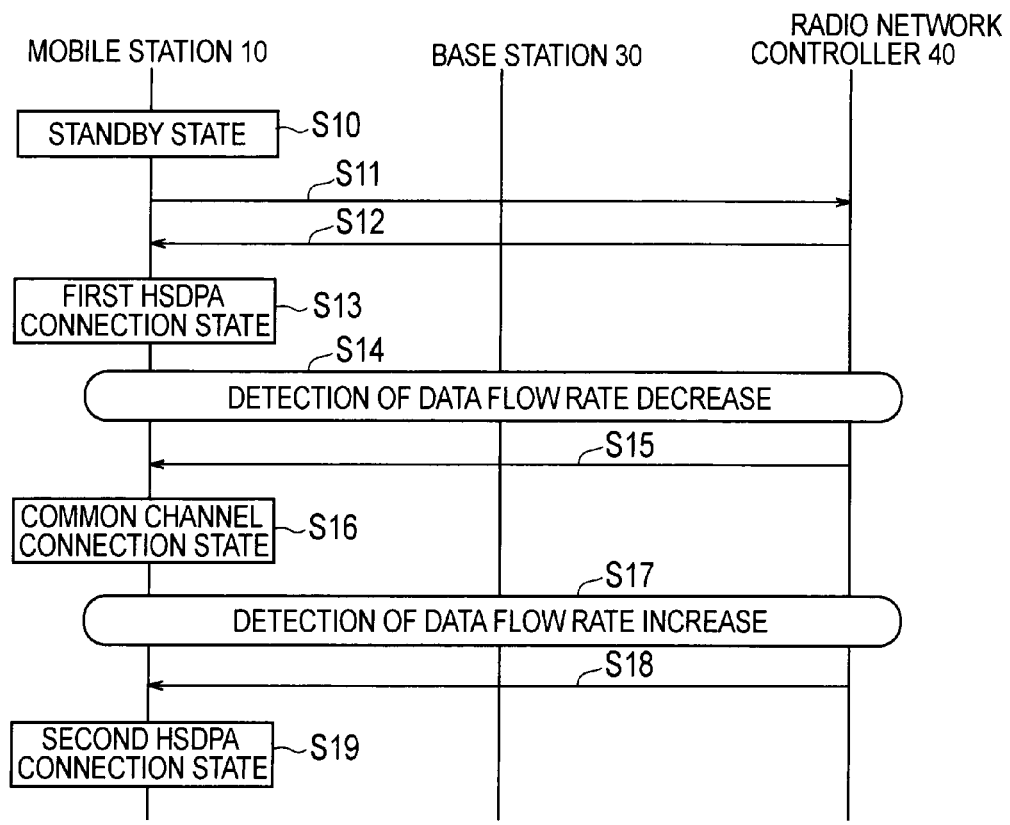
FIG. 5 is a diagram showing an operation of the communication system 100 according to the first embodiment.
Figure 6:
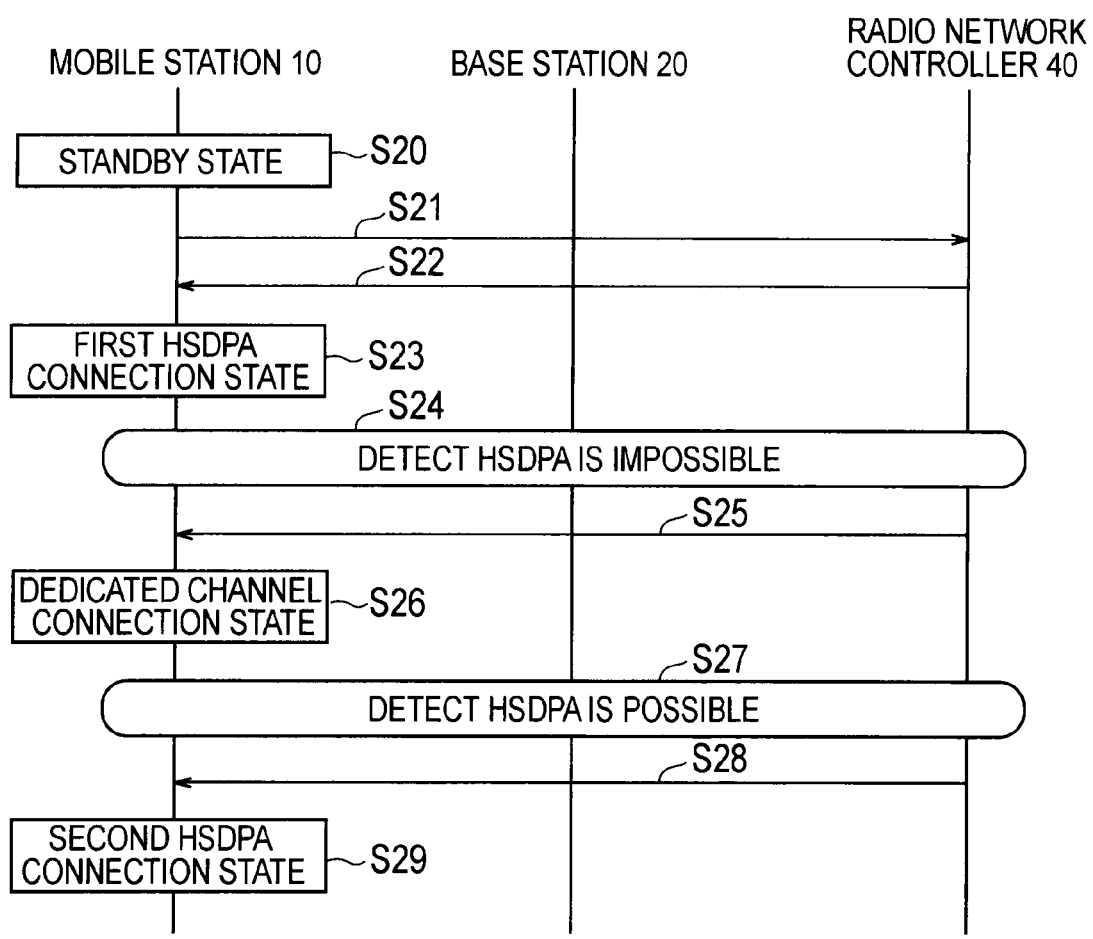
FIG. 6 is a diagram showing an operation of the communication system 100 according to the first embodiment.

An operation of the communication system according to the first embodiment is explained below with reference to drawings. FIG. 5 and FIG. 6 are diagrams showing the operation of the communication system 100 according to the first embodiment.

Firstly, a case wherein the state of the mobile station 10 makes transition in the order of the standby state 101, the first HSDPA connection state 102, the common channel connection state 103, and the second HSDPA connection state 105 is explained with reference to FIG. 5.

As shown in FIG. 5, the mobile station 10 is in the standby state 101 in step 10.

In step 11, the mobile station 10 transmits a connection request (such as an RRC Connection Request) requesting the setup of a channel (radio link) compatible with HSDPA to the radio network controller 40.

In step 12, the radio network controller 40 transmits an RAB connection setup (Radio Bearer Setup) specifying the second size as the size of the RLC PDU to the mobile station 10. Here, the RAB connection setup (Radio Bearer Setup) includes information indicating the setup of a channel (radio link) compatible with HSDPA.

In step 13, the mobile station 10 makes transition from the standby state 101 to the first HSDPA connection state 102.

In step 14, the radio network controller 40 detects that the flow rate of the downlink data has fallen below the predetermined threshold value. Note that the fall of the flow rate of the downlink data below the predetermined threshold value may also be detected by the mobile station 10. In such a case, the fall of the flow rate of the downlink data below the predetermined threshold value is notified from the mobile station 10 to the radio network controller 40.

In step 15, the radio network controller 40 transmits an RAB switching setup (Radio Bearer Reconfiguration) specifying the first size as the size of the RLC PDU to the mobile station 10. Here, the RAB switching setup (Radio Bearer Reconfiguration) includes information indicating the setup of a channel (radio link) common to the mobile stations 10 existing in the cell.

In step 16, the mobile station 10 makes transition from the first HSDPA connection state 102 to the common channel connection state 103.

In step 17, the radio network controller 40 detects that the flow rate of the downlink data has exceeded the predetermined threshold value. Note that the rise of the flow rate of the downlink data above the predetermined threshold value may also be detected by the mobile station 10. In such a case, the rise of the flow rate of the downlink data above the predetermined threshold value is notified from the mobile station 10 to the radio network controller 40.

In step 18, the radio network controller 40 transmits an RAB switching setup (Radio Bearer Reconfiguration) specifying the first size as the size of the RLC PDU to the mobile station 10. Here, the RAB switching setup (Radio Bearer Reconfiguration) includes information indicating the setup of a channel (radio link) compatible with HSDPA.

Secondly, a case wherein the state of the mobile station 10 makes transition in the order of the standby state 101, the first HSDPA connection state 102, the dedicated channel connection state 104, and the second HSDPA connection state 105 is explained with reference to FIG. 6.

As shown in FIG. 6, the mobile station 10 is in the standby state 101 in step 20.

In step 21, the mobile station 10 transmits a connection request (such as an RRC Connection Request) requesting the setup of a channel (radio link) compatible with HSDPA to the radio network controller 40.

In step 22, the radio network controller 40 transmits an RAB connection setup (Radio Bearer Setup) specifying the second size as the size of the RLC PDU to the mobile station 10. Here, the RAB connection setup (Radio Bearer Setup) includes information indicating the setup of a channel (radio link) compatible with HSDPA.

In step 23, the mobile station 10 makes transition from the standby state 101 to the first HSDPA connection state 102.

In step 24, the radio network controller 40 detects that the mobile station 10 has moved from within a cell compatible with HSDPA to outside a cell compatible with HSDPA. Note that the movement of the mobile station 10 from within a cell compatible with HSDPA to outside a cell compatible with HSDPA may also be detected by the mobile station 10. In such a case, the movement of the mobile station 10 from within a cell compatible with HSDPA to outside a cell compatible with HSDPA is notified from the mobile station 10 to the radio network controller 40.

In step 25, the radio network controller 40 transmits an RAB switching setup (Radio Bearer Reconfiguration) specifying the first size as the size of the RLC PDU to the mobile station 10. Here, the RAB switching setup (Radio Bearer Reconfiguration) includes information indicating the setup of a channel (radio link) individual to the mobile station 10.

In step 26, the mobile station 10 makes transition from the first HSDPA connection state 102 to the dedicated channel connection state 104.

In step 27, the radio network controller 40 detects that the mobile station 10 has moved from outside a cell compatible with HSDPA to within a cell compatible with HSDPA. Note that the movement of the mobile station 10 from outside a cell compatible with HSDPA to within a cell compatible with HSDPA may also be detected by the mobile station 10. In such a case, the movement of the mobile station 10 from outside a cell compatible with HSDPA to within a cell compatible with HSDPA is notified from the mobile station 10 to the radio network controller 40.

In step 28, the radio network controller 40 transmits an RAB switching setup (Radio Bearer Reconfiguration) specifying the first size as the size of the RLC PDU to the mobile station 10. Here, the RAB switching setup (Radio Bearer Reconfiguration) includes information indicating the setup of a channel (radio link) compatible with HSDPA.

(Operation and Effect)

In the embodiment, when transition is performed from the first connection state (common channel connection state 103 or dedicated channel connection state 104) to the second connection state (second HSDPA connection state 105) after transition from the second connection state (first HSDPA connection state 102) to the first connection state (common channel connection state 103 or dedicated channel connection state 104), the size of the data unit (RLC PDU) is maintained in the first size without changing to the second size. Thus, the rise in the transmission rate is compromised, but the discard of the data unit (RLC PDU) due to a change in the size of the data unit (RLC PDU) is prevented. That is, the loss of data is reduced.

In the embodiment, for example, the loss of data can be reduced even without providing a PDCP (Packet Data Convergence Protocol) layer as an upper layer of the RLC layer, or without executing retransmission control in the PDCP layer.

Other Embodiments

The present invention is explained through the above embodiments, but it must not be assumed that this invention is limited by the statements and drawings constituting a part of this disclosure. From this disclosure, various alternative embodiments, examples, and operational technologies will become apparent to those skilled in the art.

In the above-described embodiment, the downlink communication is described as an example; however, the present embodiment is not limited thereto. Specifically, the embodiment may be applied to an uplink communication.

In the above embodiment, the common channel connection state 103 and the dedicated channel connection state 104 are illustrated as the first connection state for transmitting the data unit in the first size. Furthermore, the HSDPA connection state is illustrated as the second connection state for transmitting the data unit in the second size. However, the embodiment is not limited thereto. In the embodiment, when transition is performed from the first connection state to the second connection state after transition from the second connection state to the first connection state, and then, the data unit may be maintained. That is, it must be noted that specific names according to the first connection state and second connection state are not important. Furthermore, as regards the states of the mobile station 10, rather than just those illustrated in the embodiment, there may be other connection states as well.

In the above described embodiment, the radio network controller 40 is configured to control the size of the data unit, but the embodiment is not limited thereto. For example, in LTE (Long Time Evolution), the MME (Mobility Management Entity) provided in EPC (Evolved Packet Core) may also control the size of the data unit. Alternatively, the radio base station 30 may also control the size of the data unit.

INDUSTRIAL APPLICABILITY

According to the present invention, it is possible to provide a communication method, a communication system, and a control apparatus by which it is possible to reduce a data loss.

The invention claimed is:

1. A communication method of switching between a first connection state that transmits a data unit in a first size and a second connection state that transmits the data unit in a second size that is larger than the first size, the communication method comprising:

maintaining the size of the data unit in the first size, when transition is performed from the first connection state to the second connection state after transition is performed from the second connection state to the first connection state.

2. The communication method according to claim 1, comprising:

transmitting, from a receiver configured to receive the data unit to a transmitter configured to transmit the data unit, acknowledge information indicating whether or not the data unit is received successfully; and retransmitting, from the transmitter to the receiver, the data unit for which the receiver fails to receive.

3. The communication method according to claim 1, comprising:

the first size and the second size are of a fixed length, and the data unit is a protocol data unit of the RLC layer.

4. The communication method according to claim 3, wherein the first size is 42 octets, and the second size is 82 octets.

5. The communication method according to claim 1, wherein the first connection state is a common channel connection state, and the second connection state is an HSDPA connection state.

6. The communication method according to claim 1, wherein the first connection state is a dedicated channel connection state, and the second connection state is an HSDPA connection state.

7. A communication system configured to switch between a first connection state that transmits a data unit in a first size and a second connection state that transmits the data unit in a second size that is larger than the first size, the communication system comprising:

circuitry configured to maintain the size of the data unit in the first size, when transition is performed from the first connection state to the second connection state after transition is performed from the second connection state to the first connection state.

8. A control apparatus configured to switch between a first connection state that transmits a data unit in a first size and a second connection state that transmits the data unit in a second size that is larger than the first size, the control apparatus comprising:

circuitry configured to maintain the size of the data unit in the first size, when transition is performed from the first connection state to the second connection state after transition is performed from the second connection state to the first connection state.

* * * * *